(12) United States Patent
Stratton et al.

(10) Patent No.: US 9,523,832 B2
(45) Date of Patent: Dec. 20, 2016

(54) HIGH TEMPERATURE, ZERO FIBER STRAIN, FIBER OPTIC CABLE

(71) Applicant: AFL Telecommunications LLC, Duncan, SC (US)

(72) Inventors: Craig Stratton, Spartanburg, SC (US); David Payne, Moore, SC (US)

(73) Assignee: AFL Telecommunications LLC, Duncan, SC (US)

(*) Notice: Subject to any disclaimer, the term of this patent is extended or adjusted under 35 U.S.C. 154(b) by 525 days.

(21) Appl. No.: 13/849,870

(22) Filed: Mar. 25, 2013

(65) Prior Publication Data

US 2015/0268433 A1 Sep. 24, 2015

Related U.S. Application Data

(60) Provisional application No. 61/614,870, filed on Mar. 23, 2012.

(51) Int. Cl.
*G02B 6/44* (2006.01)

(52) U.S. Cl.
CPC ............ *G02B 6/443* (2013.01); *G02B 6/4416* (2013.01); *G02B 6/4436* (2013.01); *G02B 6/4413* (2013.01); *G02B 6/4427* (2013.01); *G02B 6/4492* (2013.01)

(58) Field of Classification Search
None
See application file for complete search history.

(56) References Cited

U.S. PATENT DOCUMENTS

| | | | | |
|---|---|---|---|---|
| 4,072,398 A * | 2/1978 | Larsen | ............... | G02B 6/4413 385/111 |
| 4,715,678 A * | 12/1987 | Johnson | ............... | G02B 6/4401 385/109 |
| 5,224,192 A * | 6/1993 | Wagman | ............... | G02B 6/443 385/109 |
| 5,448,669 A * | 9/1995 | Dunn | ............... | G02B 6/4416 174/117 R |
| 5,555,338 A * | 9/1996 | Haag | ............... | G02B 6/4416 174/40 R |
| 5,642,452 A * | 6/1997 | Gravely | ............... | G02B 6/4433 385/103 |
| 6,195,488 B1 * | 2/2001 | Song | ............... | G02B 6/4416 385/101 |
| 6,219,482 B1 * | 4/2001 | Matsuzaki | ............... | G02B 6/4423 385/100 |
| 6,249,629 B1 * | 6/2001 | Bringuier | ............... | G02B 6/4433 385/101 |
| 6,654,525 B2 * | 11/2003 | Nechitailo et al. | ............... | 385/103 |
| 6,907,170 B1 * | 6/2005 | Maida, Jr. | ............... | 385/100 |
| 7,218,820 B2 * | 5/2007 | Maida, Jr. | ............... | 385/100 |
| 7,646,953 B2 * | 1/2010 | Dowd et al. | ............... | 385/109 |
| 8,041,165 B2 * | 10/2011 | Neuroth | ............... | G02B 6/4427 385/101 |
| 8,111,960 B2 * | 2/2012 | Dowd et al. | ............... | 385/109 |
| 8,295,665 B2 * | 10/2012 | Herbst | ............... | 385/104 |
| 8,831,390 B2 * | 9/2014 | Kurtscheid | ............... | G02B 6/443 385/101 |

(Continued)

*Primary Examiner* — Rhonda Peace
(74) *Attorney, Agent, or Firm* — Dority & Manning, P.A.

(57) ABSTRACT

A cable including an outer metal tube and a first layer wire inside the outer metal tube, wherein the first layer wire has five inner elements surrounding a metallic center member and at least one of the inner elements is a metal tube containing an optical fiber.

12 Claims, 3 Drawing Sheets

(56) References Cited

U.S. PATENT DOCUMENTS

| | | | | |
|---|---|---|---|---|
| 8,861,911 B2* | 10/2014 | Shin et al. | | 385/101 |
| 9,069,148 B2* | 6/2015 | Herbst | | |
| 9,244,239 B2* | 1/2016 | Herbst | | E21B 47/011 |
| 2004/0258373 A1* | 12/2004 | Andreassen | | G01D 5/35303 |
| | | | | 385/100 |
| 2006/0018611 A1* | 1/2006 | Maida, Jr. | | 385/102 |
| 2006/0072886 A1* | 4/2006 | Kim | | G02B 6/441 |
| | | | | 385/115 |
| 2008/0247718 A1* | 10/2008 | Dowd et al. | | 385/113 |
| 2010/0008631 A1* | 1/2010 | Herbst | | 385/101 |
| 2010/0142903 A1* | 6/2010 | Dowd et al. | | 385/109 |
| 2010/0266248 A1* | 10/2010 | Neuroth | | G02B 6/502 |
| | | | | 385/101 |
| 2011/0058778 A1* | 3/2011 | Herbst | | G01M 5/0091 |
| | | | | 385/100 |
| 2011/0280529 A1* | 11/2011 | Herbst | | E21B 47/011 |
| | | | | 385/102 |
| 2013/0039625 A1* | 2/2013 | Herbst | | 385/101 |
| 2013/0071074 A1* | 3/2013 | Kurtscheid | | G02B 6/443 |
| | | | | 385/101 |
| 2013/0279864 A1* | 10/2013 | Herbst | | 385/101 |
| 2014/0029904 A1* | 1/2014 | Herbst | | E21B 47/011 |
| | | | | 385/102 |
| 2014/0056553 A1* | 2/2014 | Villiger | | G02B 6/4407 |
| | | | | 385/12 |
| 2015/0268433 A1* | 9/2015 | Stratton | | G02B 6/4436 |
| | | | | 385/101 |

* cited by examiner

HIGH TEMPERATURE, ZERO FIBER STRAIN, FIBER OPTIC CABLE

CROSS-REFERENCE TO RELATED APPLICATIONS

This application is based upon and claims the benefit of priority from U.S. Provisional Application No. 61/614,870, filed Mar. 23, 2012, in the United States Patent and Trademark Office, the disclosures of which are incorporated herein in its entirety by reference.

BACKGROUND

1. Field

The invention is related to a fiber optic cable, and more particularly to a high temperature zero fiber strain fiber optic cable that can be deployed in oil and gas well applications.

2. Related Art and Background

There is a need for high temperature, zero fiber strain, fiber optic cables that can be deployed in high temperature environments, such as oil and gas wells. These cables may be deployed directly in the wells as opposed to in a coiled tube that is then deployed in the well.

Some conventional cables use stranded tubes where the tubes are made with ETFE (Teflon). These designs have been problematic in the field for several reasons. One is that Teflon and other plastic compounds are known to evolve hydrogen at elevated temperatures. Hydrogen evolution is detrimental to the optical performance of the cable. Another issue is the upper temperature is still limited to a maximum of 150 degrees C. Though there are some polymers that are capable of going to higher temps, such as 300 degrees C., none can go to 600 C or even higher.

When fiber optics are deployed via coiled tubing they must first be installed into the coiled tube. There are various methods defined in prior art for accomplishing this installation however all of them require equipment and processes that add complexity, risk, and cost. Having a fiber optic element that is able to be directly deployed via injection negates the need for these added processes.

In order to be deployed directly in a well, the cable structure must have an adequate cross sectional area and modulus to provide sufficient buckling strength to allow for injecting under force (pushing) into a deviated well bore. This type of deployment is not commonly achieved with existing fiber optic cable designs. However, the invention, shown in the embodiment in FIG. 1—utilizing 1 or 2 tubes and 3 or 4 solid metallic fillers provides for adequate strength to be directly injected into a wellbore. Another type of directly deployable cable in a vertical wellbore is known as a "slickline". A slickline cable has a solid circular outer surface which allows the cable to be sealed off at the well head using a packer. It is much easier and less costly to manage wellbore pressure using this type of cable and seal. Slickline cables are typically lowered into a vertical wellbore by their own suspended weight. Commonly, a weight bar is added to assist in the initial descent. A common problem with slickline cables is the metallic tubing will fatigue and fracture after a certain number of cycles. If the tubing fractures in the well this leads to significant challenges "fishing" the remnant out of the wellbore. A typical solution to enhance the fatigue life for slickline cables is by using duplex alloys or other high endurance alloys that can be conditioned by heat treatment. Heat treatment of the metal tubing is not an option when the cable contains a fiber optic or copper core as the temperature of the heat treatment exceeds the temperature rating of the core.

Therefore there is a need for a cable that has the following features. Although the invention is not limited to a cable that has these features.

1. High temperature capability—zero fiber strain up to at least 600 degrees C.
2. Exceptionally high crush resistance useful for permanently installed cables in open hole.
3. High buckling strength for injection into horizontal or high pressure wells.
4. Enhanced sensitivity to thermal and acoustic energy through proximity of fiber tube to outer surface.
5. Mechanically robust to improve resistance to hydraulic fracturing fluids.
6. Construction allows for use a high strength slickline logging cable.
7. Higher fatigue resistance for longer service life in dynamic applications.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the invention is a cable with an outer metal tube, and a first layer wire inside the outer metal tube, wherein the first layer wire consists of five inner elements surrounding a metallic center member, and wherein at least one of the inner elements is a metal tube containing an optical fiber.

Other features of the embodiment may include at least one of the inner elements being a metal member, at least one of the inner elements being a metal tube with a metal filler, the outer tube being stainless steel, at least one of the inner elements being stainless steel, the cable having zero fiber strain up to at least approximately 600 degrees C., four of the inner elements being metal members, and four of the inner elements being metal tubes with metal fillers.

One embodiment of the invention is a cable with an outer metal tube, and a first layer wire inside the outer metal tube, wherein the first layer wire consists of three inner elements, and wherein at least one of the inner elements is a metal tube containing an optical fiber.

Other features of this embodiment may include at least one of the inner elements being a metal member, at least one of the inner elements being a metal tube with a metal filler, the outer tube being stainless steel, at least one of the inner elements being stainless steel, the cable having zero fiber strain up to at least approximately 600 degrees C., two of the inner elements being metal members, and two of the inner elements being metal tubes with metal fillers.

DETAILED DESCRIPTION

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, an exemplary embodiment will be described with reference to accompanying drawings.

The invention provides an internal core structure that enhances the fatigue life of the cable and reduces the risk of the cable falling into the wellbore. Due to the helically stranded nature of the core, each element in the core will undergo less bend strain than that of the outer tube during deployment and retrieval over standard sheaves and bullwheels. This means the fatigue life of the core will exceed the fatigue life of the tube such that if the outer tube undergoes fatigue failure the core will still remain intact preventing the cable from dropping into the wellbore.

Figure 1:
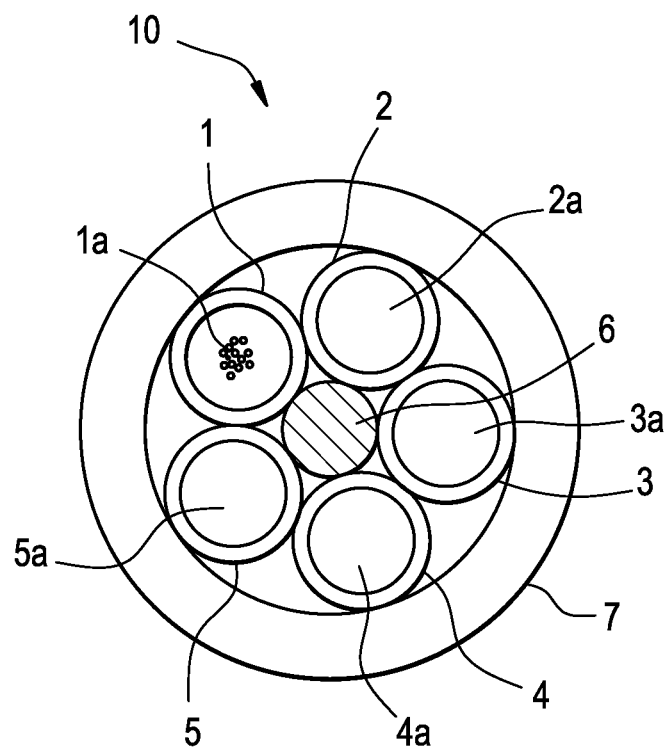
FIG. 1 is a cross-sectional view of an embodiment of a cable according to the present invention.

Referring to the drawings, FIG. 1 is a cross-sectional view of a cable 10 according to an exemplary embodiment of the invention. In this embodiment, cable 10 has an overall diameter of approximately 9.52 mm. However, cable 10 could have other diameters, including, but not limited to 6.35 mm. Cable 10 includes a metal outer tube 7 with a thickness of approximately 1.24 mm that is made of 316 stainless steel. However, the outer tube 7 could have other thicknesses, including, but not limited to 1.25 mm, and could be made of other metals, including, but not limited to nickel alloys such as Incoloy and Inconel as well as high strength low alloy grades of steel.

Inside outer tube 7 is a first layer wire with five inner elements 1-5 with a diameter of approximately 2.4 mm. The first layer wire may be helically wound. At least one of the inner elements 1-5 is a metal tube that may be made of 316 stainless steel. In the embodiment shown in FIG. 1, all of the inner elements 1-5 are metal tubes. Inner elements 1-5 could have other diameters, including, but not limited to 1.32 mm, and could be made of other metals, including, but not limited to nickel alloys such as Incoloy, Inconel, or ferittic and austenitic stainless steels, or high strength low alloy steels. Inner element 1 is filled with one or more optical fibers 1a. Inner element 1 may also be filled with a gel material. Inner elements 2-5 are filled with a metallic filler 2a-5a, which may include, but not be limited to stainless steel, nickel alloys and galvanized improved plow steel (GIPS). In other embodiments, one or all of inner elements 2-5 may be replaced with metal wires/members.

In this particular embodiment there is one inner element with an optical fiber and four inner elements with metallic filler in the first layer wire. However, some or all of the inner elements may contain one or more optical fibers.

The first layer wire surrounds a metallic center member/wire 6 with a diameter of approximately 1.8 mm. However, metallic center member/wire 6 could have other diameters, including, but not limited to 1.0 mm. The metallic center member/wire may be made of metals which may include, but not be limited to stainless steel, nickel alloys and galvanized improved plow steel (GIPS).

In this embodiment there was zero fiber strain for the cable up to approximately 600 degrees C. However, it is possible to increase the strain free window by shortening the lay length.

Figure 2:
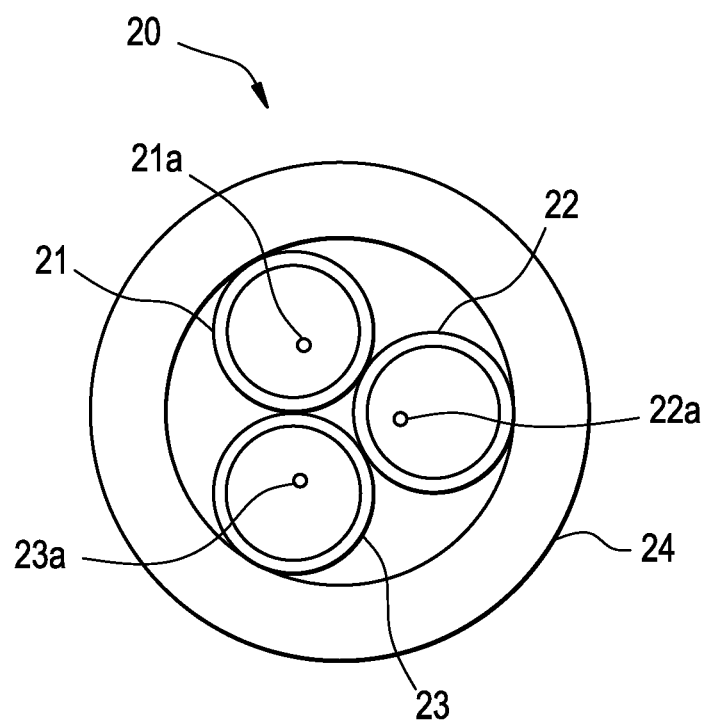
FIGS. 2 and 3 are cross-sectional views of other embodiments of a cable according to the present invention.

FIG. 2 is a cross-sectional view of a cable 20 according to an exemplary embodiment of the invention. In this embodiment, cable 20 has an overall diameter of approximately 9.52 mm. However, cable 20 could have other diameters. Cable 20 includes a metal outer tube 24 with a thickness of approximately 1.24 mm that is made of 316 stainless steel. However, the outer tube 24 could have other thicknesses and could be made of other metals, including, but not limited to nickel alloys such as Incoloy, Inconel, or ferittic and austenitic stainless steels, or high strength low alloy steels.

Inside outer tube 24 is a first layer wire with three inner elements 21-23 with a diameter of approximately 3.0 mm. The first layer wire may be helically wound. At least one of the inner elements 21-23 is a tube that may be made of 316 stainless steel such as Incoloy, Inconel, or ferittic and austenitic stainless steels, or high strength low alloy steels. In the embodiment shown in FIG. 2, all of the inner elements 21-23 are tubes. Inner elements 21-23 could have other diameters, and could be made of other metals, including, but not limited to nickel alloys. Inner elements 21-23 are filled with one or more optical fibers 21a-23a. Inner elements 21-23 may also be filled with a gel material.

Figure 3:
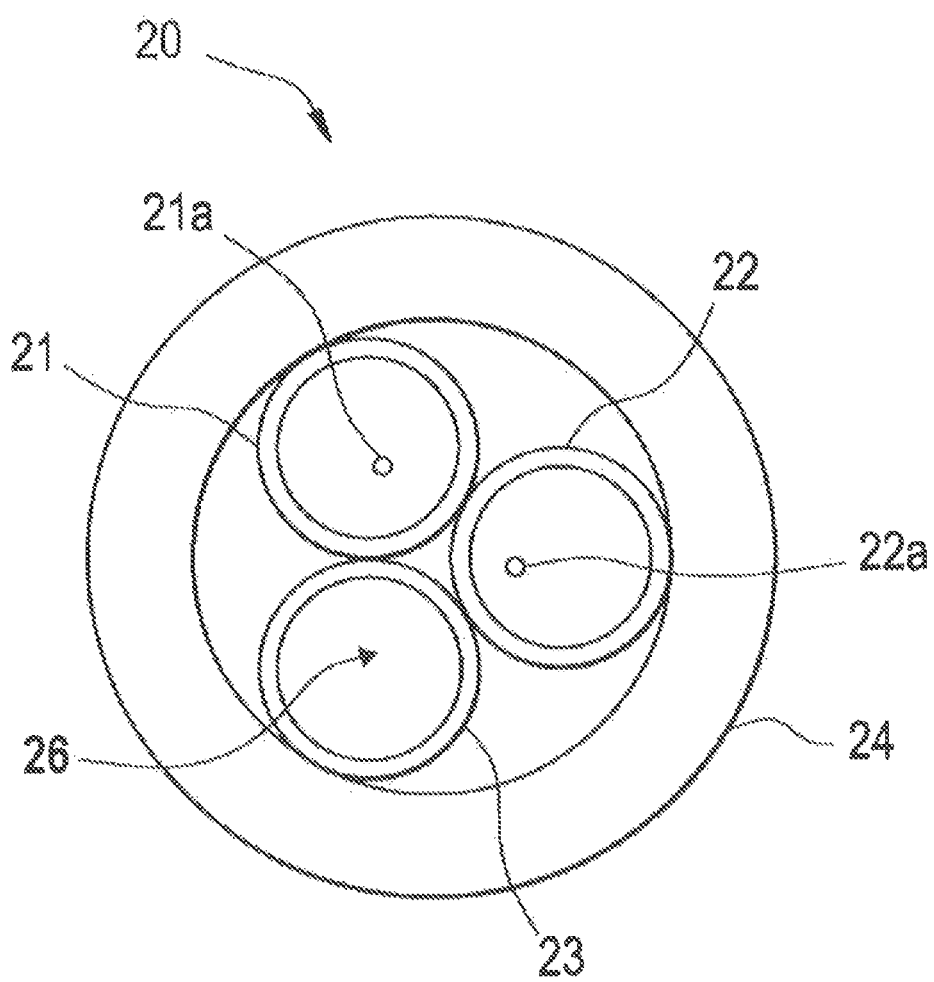

In this particular embodiment of FIG. 2, all of the inner elements are filled with an optical fiber. However, one or two of the inner elements may, as shown in FIG. 3, be filled with a metallic filler 26, which may include, but not be limited to stainless steel, nickel alloys and galvanized improved plow steel (GIPS). In other embodiments, one or two of the inner elements may be replaced with metal wires/members.

As mentioned above, although the exemplary embodiments described above are various fiber optic cables, they are merely exemplary and the general inventive concept should not be limited thereto, and it could also apply to other types of cables.

What is claimed is:

1. A cable, comprising:
    an outer metal tube; and
    a first layer wire inside said outer metal tube;
    wherein said first layer wire consists of five metallic inner elements surrounding a solid metallic center member;
    wherein at least a first one of said metallic inner elements is a metal tube containing containing an optical fiber, and wherein at least a second one of said metallic inner elements is free from optical fibers and is a metal tube with a metal filler.

2. The cable of claim 1, wherein said outer tube comprises stainless steel.

3. The cable of claim 1, wherein at least one of said inner elements comprises stainless steel.

4. The cable of claim 1, wherein said cable has zero fiber strain up to at least approximately 600 degrees C.

5. The cable of claim 1, wherein four of said inner elements are metal tubes with metal fillers.

6. The cable of claim 1, wherein the five inner elements are helically wound around the metallic center member.

7. A cable, comprising:
    an outer metal tube; and
    a first layer wire inside said outer metal tube;
    wherein said first layer wire consists of three metallic inner elements;
    wherein at least a first one of said metallic inner elements is a metal tube containing an optical fiber, and wherein at least a second one of said metallic inner elements is free from optical fibers and is a metal tube with a metal filler.

8. The cable of claim 7, wherein said outer tube comprises stainless steel.

9. The cable of claim 7, wherein at least one of said inner elements comprises stainless steel.

10. The cable of claim 7, wherein said cable has zero fiber strain up to at least approximately 600 degrees C.

11. The cable of claim 7, wherein two of said inner elements are metal tubes with metal fillers.

12. The cable of claim 7, wherein the three inner elements are helically wound.

* * * * *